Figure 1A:
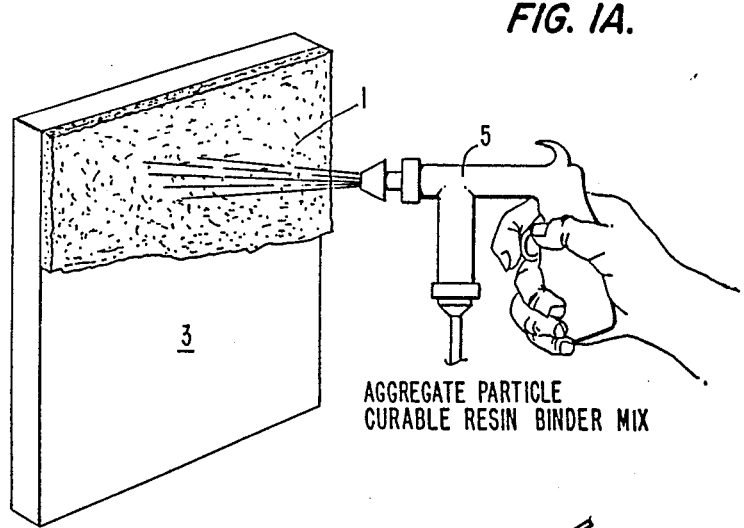

United States Patent [19]

Baskin

[11] Patent Number: 4,956,030
[45] Date of Patent: Sep. 11, 1990

[54] METHOD OF FABRICATING SIMULATED STONE SURFACES AND IMPROVED SIMULATED STONE PRODUCTS

[75] Inventor: David Baskin, Duxbury, Mass.

[73] Assignee: Academy of Applied Science, Concord, N.H.

[21] Appl. No.: 417,272

[22] Filed: Oct. 5, 1989

Related U.S. Application Data

[63] Continuation-in-part of Ser. No. 235,702, Aug. 18, 1988, Pat. No. 4,877,656, and a continuation of Ser. No. 928,270, Nov. 6, 1987, abandoned.

[51] Int. Cl.$^5$ .................... B32B 31/12; B44F 9/04
[52] U.S. Cl. ........................ 156/61; 52/309.1;
52/596; 52/612; 52/DIG. 7; 156/245; 156/289;
156/344; 428/15; 428/152; 428/542.2
[58] Field of Search ............. 52/309.1, 596, 612,
52/DIG. 7; 156/61, 245, 289, 344; 428/15, 152, 542.2

[56] References Cited

U.S. PATENT DOCUMENTS

| | | | |
|---|---|---|---|
| 3,341,396 | 9/1967 | Iverson | 428/15 X |
| 3,515,619 | 6/1970 | Barnette | 428/15 |
| 4,385,088 | 5/1983 | Baskin | 428/15 |

Primary Examiner—Robert A. Dawson
Attorney, Agent, or Firm—Rines and Rines

[57] ABSTRACT

A method of fabricating stone-simulated articles including facings for substrates, involving roller-flattening mixtures of preferably polyester resins, curing agent, polyester-dispersed pigments, fumed silica (and other) filler and aluminum trihydrate filler into flat stone-pattern-simulating surfaces or slabs, maintaining the same sufficiently cool (as by refrigeration) to prevent curing until it is desired to use the same, and then applying to, and rolling over a substrate to be covered or faced, or otherwise forming the same into the desired article, and permitting to cure under the action of said curing agent, with the resulting product containing the stone-simulated pattern throughout.

11 Claims, 1 Drawing Sheet

AGGREGATE PARTICLE
CURABLE RESIN BINDER MIX

HI-GLOSS
MIRROR SMOOTH

PATTERN
(TEXTURE EMBOSSING)

METHOD OF FABRICATING SIMULATED STONE SURFACES AND IMPROVED SIMULATED STONE PRODUCTS

This application is a continuation-in-part of U.S. application Ser. No. 235,702, filed Aug. 18, 1988 and now U.S. Pat. No. 4,877,656, as a continuation of parent application Ser. No. 928,270, filed Nov. 6, 1986, now abandoned.

The present invention relates to artificial rock or stone-simulating facings (hereinafter stone-like) or substrates that involve synthetic coatings for substrates which simulate natural stone blocks, panels or the like.

In general, artificial or simulated natural stone products have been customarily prepared in casts or molds. Castings and molding techniques, however, have drawbacks including the circumstance that cast or molded products are generally not finished products, and the processes are relatively costly.

U.S. Pat. No. 3,341,396, for example, discloses a process for coating a substrate with a simulated natural stone coating, but with limitations, among other facets, on geometry and orientation of surface applications.

Artificial decorative rocks have been described in my earlier U.S. Pat. No. 4,385,088, but the technique therein is not applicable to the purposes of the present invention.

The invention requires the provision of a low-cost thin-layered, artificial stone-like surface on a substrate for use as an indoor or outdoor wall or other panel facing, with controlled surface finish ranging from high-gloss mirror-smoothness to controlled and predetermined textured finishes, has not heretofore been readily available, particularly as a standard construction material.

It is an object of the present invention, accordingly, to provide a new and improved method of low-cost fabrication of artificial or simulated stone-like facings on substrates and a novel product resulting therefrom, superior to prior simulated natural stone products and processes in feel and simulation of natural stone; and also to provide standard pre-fabricated construction panels or the like with controlled surface finish, ranging from high gloss surfaces to predetermined textured, embossed or patterned surfaces.

A further object is to provide a novel intermediary material for fabricating artificial stone-like synthetic resin facings and coverings and other items or articles that may be stored under refrigeration and maintained uncured until applied to substrates-to-be-faced, then becoming cured without heat after application to the substrates; and a novel method for utilization of the same.

An additional object is to enable the fabrication not only of facings and coverings of substrates in different forms and shapes, but also of solid slabs of simulated stone and other decorative articles.

Other and further objects will be explained hereinafter and are more particularly delineated in the appended claims.

In summary, the invention of this continuation-in-part application embraces a method of fabricating an artificial stone-like facing as for attachment to a substrate, that comprises, preparing a mixture of a wet, soft and uncured synthetic resin binder, color pigment and filler particles and curing agent for the resin, for ultimate attachment to a permanent substrate; applying the mixture to a temporary substrate presenting a wet surface of irregular and uneven particles; successively and continuously pressing together by rolling pressure successive adjacent portions of the irregular and uneven surface of the wet, soft and uncured resin mixture against the temporary substrate into flat form and maintaining the mixture in a cooled condition as by refrigeration to inhibit curing and keeping the same soft and uncured until removed from such cooling for application to a permanent substrate. Upon such removal from said cooling, the mixture is applied to the said permanent substrate, is rolled there against and thereafter permitted to cure by the action of said curing agent, without external heat. Preferred products resulting from the method, including best modes and embodiments therefor, are hereinafter presented.

Figure 1B:
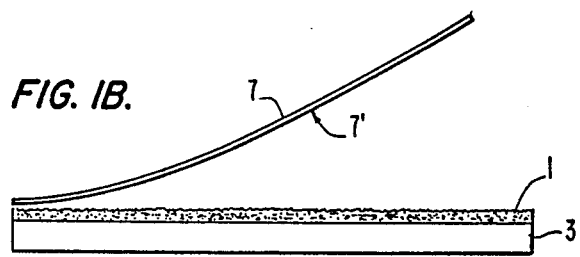
Figure 1C:
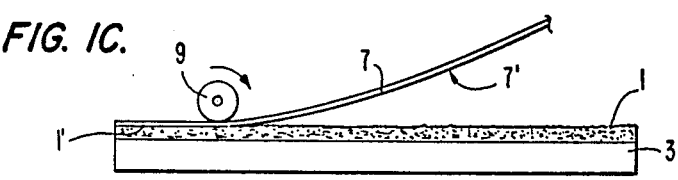
Figure 1D:
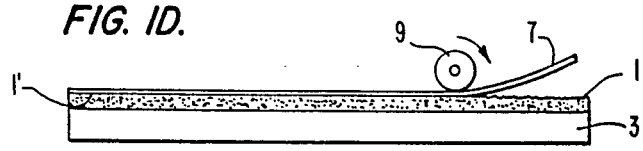
Figure 2A:
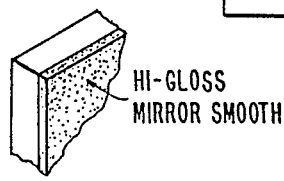
Figure 2B:
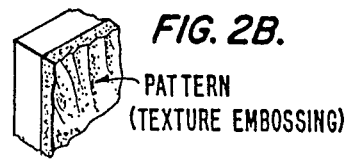

The invention will now be described with reference to the accompanying drawings of the parent application in which FIGS. 1A through 1D illustrate successive method steps in fabricating the novel products of the invention; and FIGS. 2A and 2B are fragmentary isometric views of finished products, exemplarily shown with a high-gloss finish and a textured finish, respectively.

Referring to FIG. 1A, as disclosed in said parent application, a curable synthetic resin composition or mixture including fine aggregate stone or related particles, as of silica, etc., is shown applied at 1 as a thin layer to a substrate 3 as of, for example, wallboard, plywood, plastic foam or other surfaces, by means of a spray gun 5. The wet fine aggregate-uncured resin binder with appropriate curing agent comprising the layer or coating mixture may also be applied to the substrate by other suitable means including troweling, brushing, or rolling, as illustrations.

The curable synthetic resin composition useful for carrying out this invention and with which particular aggregate stone and related particles, such as silica and the like, are mixed, may have as a component a polyester, epoxy, urethane or cemetitious base. Virtually any curable synthetic resinous liquid coating material may be used. The preferred coating materials are the polymerizable unsaturated polyesters such as those prepared from ethylenically unsaturated polycarboxylic acids and polyhydric alcohols. Such coating materials may also contain a copolymerizable ethylenically unsaturated compound such as styrene to make the unsaturated polyester resin more fluid and also to cross link the resin at the time of curing. In the most preferred embodiment, the primary component of the curable synthetic resin composition is PolyLite ® Polyester Resin 33-031, sold by Reichhold Chemicals, Inc. of Elizabeth, N.J. PolyLite Polyester Resin 33-031 is an unsaturated polyester resin in styrene monomer and is thixotropic and prepromoted for room temperature cure with the addition of methyl ethyl ketone peroxide. Its boiling point is approximately 295° F. and its specific gravity is 1.05–1.22 at 25° C. ($H_2O=1$). It is approximately 44–48% styrene monomer and its viscosity is 350–550 (Brookfield Model LVF $3 at 60 rpm CPS).

Thickening agents may also be added to the curable synthetic resin composition to thicken the composition to a degree suitable for a particular method of application and/or suitable for application to a particular surface. For example, application by troweling generally requires a thicker composition than application by spraying. Also, surfaces oriented vertically require a thicker composition than surfaces oriented horizontally.

A composition applied to a vertically oriented surface may run or drip producing imperfections if it is too thin. Generally, a thickener is added to achieve a composition having a consistency that will not run or sag after it is applied to a particular surface. In the most preferred embodiment, CAB-O-SIL® M-5 Fumed Silica, an amorphous fumed silica, having a specific surface area of 200 plus or minus 25 square meters/gram as determined by B.E.T. method, sold by Cabot Corporation of Tuscola, Ill., is used as the thickener.

It is also desirable to add one or more matrix fillers to the composition to reduce the cost and/or influence the consistency of the composition. Matrix fillers are also used to influence the strength of the cured composition. The filler is preferably finally divided, having an average particle size falling between 10 and 325 grit. The filler may be any one of the well-recognized fillers used in the prior art including powdered talc, powdered quartz, fine silica, diatomaceous earth, gypsum, powdered glass, clay minerals such as china clay (Kaolin), illite, powdered chalk, powdered marble, Powdered limestone, aluminum silicate, aluminum stearate, calcium silicate, boracite, borax, and aluminum trihydrate. The latter, aluminum trihydrate, is especially effective in improving the fire-resistent properties of the final product and is a preferred filler.

The filler can contribute to the color, transparency, and surface properties of the cured composition. Therefore, it is appropriate to use different fillers when simulating different stones. For example, when simulating marble, the general criteria for the filler is one which, when homogeneously mixed into the matrix resin, produces a product which is translucent. In this manner, a depth is given to the product which helps create the appearance of marble. The amount of filler and the particle size of the filler may also influence the translucency of the final product.

It is also appropriate to dilute the composition with a solvent to provide a viscosity that is appropriate for the manner in which the composition is to be applied. Spraying, for example, requires a much less viscous composition than troweling. Thus, to achieve a viscosity suitable for spraying, a solvent is added. The solvent is selected such that it quickly evaporates. The solvents particularly adopted for use in the present invention include acetone, methyl ethyl ketone, xylene, ethynol and the like. Acetone is the preferred solvent.

Color pigment may be added to the composition so that the color of the composition has the desired background color. The color pigment is preferably an inert, inorganic, finely divided substance applied either as a dry powder or in paste form. Such color pigments are commonly known and readily available. Preferably the color pigment is a selected P.M.S. Polyester-dispersed pigment, available from P.M.S. Consolidated of Somerset, New Jersey.

Finally, a polymerization catalyst agent or mixture of catalysts is added to the composition. Such catalysts are well-recognized in the art and usually are free radical catalysts based on a peroxide-type compound such as for example methyl ethyl ketone peroxide, benzoyl peroxide, tertiary butyl, hydroperoxide, and the like. Typically, the catalyst may be present in amounts ranging from about 0.1 to 6% by weight of the polyester resin.

The mixture of the fine particulated aggregate stone or related particles and the synthetic resin composition thin layer 1 is coated onto the substrate 3 before the composition hardens or cures. Curing time will depend, of course, upon which resin and catalyst are chosen for the synthetic resin composition. The composition may be coated onto a wide variety of the conventional flat or curved substrates, as before indicated, including, wood, particle board, sheetrock, beaver board, pressed woods such as those sold under the trademarks "Masonite" and "Timblend", various pressed fiberboards, cement blocks, bricks, metals, or other common building materials.

In accordance with the present invention this coating layer 1 may be made very thin, as of the order of 1/16th of an inch for internal walls and panel faces and of the order of a 16th of an inch for outside walls.

While the mixture of the fine aggregate stone or related particles and uncured resin binder is still wet, soft and uncured, in accordance with the invention a thin flexible film 7, FIG. 1B, is applied to the rough and uneven outer or external surface of the coated layer 1. In a preferred and best mode embodiment, particularly suitable for a highly finished or high gloss product, the thin film 7 is of high gloss mirror smooth plastic sheeting such as 10 mil transparent polyethelene. As shown in successive FIGS. 1C and 1D, a very critical technique for applying the thin flexible film 7 to the outer irregular surface of the coated layer 1 is illustrated at successive moments. Specifically, the successive portions of the thin film 7 from left-to-right in the drawing, are successively and continuously pressed, as by rollers 9, against corresponding successive portions of the irregular outer surface of the layer 1. This has been found to squash the pigmented coating resin particles to mold or force conformance of the successive portions of the irregular outer surface of the layer 1 into substantially exact conformance with the surface finish of the inner surface 7' of the thin flexible film 7. This also, of course, forces the uncured aggregate particle-resin binder layer coating 1 against the substrate 3 (which, if porous or irregular, aids the attachment upon the hardening of the coated layer during curing). Thus in the left-hand part of FIG. 1C, the portion of the film 7 that has been pressed against the left-most outer surface of the layer 1 has caused the same to become smooth as shown at 1'-the mirror smoothness being achieved by the forced conformance with the high gloss inner surface finish 7' of the thin film 7 during this successive pressing process. This continues along the coating 1, FIG. 1D. The air between the film 7 and the uncured mixture coating layer 1 becomes evacuated so that the curing is rapid with the thin film sealed and pressed against the coating layer 1.

Prior to the application of the thin flexible film 7, a thin surface-conforming release layer is applied to the film surface at 7', as of a light spray of silicone or wax. Thus, when the layer 1 is hardened and cured, the panel 1-3 may be shipped to a construction site for use as a wall, panel or other facing or the like with the protection of the adhered thin outer film 7 which serves as a scratch-resistant barrier, and also protects in the stacking, storage and shipment of the product. When the facing is installed, the film 7 may be release-stripped, leaving the hardened artificial stone-like facing unitarily attached to the substrate and having the external high gloss mirror smooth finish of the inner surface of the film 7.

By this technique, relatively inexpensive artificial or simulated high gloss stone facing is provided and without the expense of sanding, polishing and other finishing steps that are required of natural slabs, prior casts, molded slabs or the like. The light-weight achievable with appropriate materials in accordance with the invention is also a most desirable feature.

In the event that some pattern or texture or embossing is desired in the outer surface of the facing, such a pattern or the like may be applied to the inner surface 7' of the thin film 7 so that a molded conforming pattern will result in the hardened external facing surface of the product manufactured by the invention. Such a pattern is illustrated in the finished product of the fragmentary product of FIG. 2B, as distinguished from the high gloss particulate pattern (for example, simulated granite) of FIG. 2A.

A preferred formulation for fabricating products such as that of FIGS. 2A and 2B is as follows: 1 part of the epoxy resin (such as DER 331 of the Reichhold Chemical Company; ½ part of Versamed 140 epoxy hardener; 1 part Cab-O-Sil fumed silica (Cabot Company) and 1½ parts of silica aggregate. Coloring agents may be used in the proportion of approximately a teaspoon to two gallons of mix, to simulate some natural stones as the resin and particles are roller squashed.

If desired, the coating may be applied also over the edges of the substrate (now shown) and, for example, along a marginal strip or wider area if desired on the underside thereof, with the film also applied thereover, to simulate a thick slab of cut stone.

In accordance with the invention of this application, it has been found that the application of the mixture 1 of the agglomorated particles of wet, soft and uncured synthetic resin binder, color pigment, filler particles and curing agent for the resin to a temporary substrate or surface 3, as of polyethelene, glass or other sheet material, and the rolling pressure at 9 over the complete coating (with or without the mold surface 7) provides a useful intermediate stone-simulating pattern product that may be maintained in uncured flat, wet, pliable and soft condition by refrigeration for subsequent use. Normal cool refrigeration temperatures (say 40° F.) and even freezing (where the rolled mixture still remains pliable since it lacks water) inhibits the operation of the above-described curing agents, particularly in the presence of sufficient of the before-described fumed silica ("Cab-O-Sil", for example) which also acts as a curing retardant (say, 7½ parts to 2 parts resin). When the user wishes to apply the stone-patterned mixture to cover a permanent surface, the pliable uncured cooled mixture slab is removed from refrigeration and is applied to the permanent surface, temporary substrate 3 (and sheet 7, if used) is removed, (which may be also done before application to the substrate). The mixture is again rolled down (as at 9), preferably with a wooden or similar roller, along that permanent substrate surface and over corners and edges, as desired, automatically curing and attaching thereto at room temperature as the curing agent activates, as before described, and thereby providing an attached simulated stone covering or surface.

Rolling small pieces together and even repairing is undetectable as the soft, uncured mixture is transferred to and rolled upon the permanent surfaces or over prior facings—which, incidentally may have all kinds of imperfections, cracks, holes, etc., that the invention admirably hides. Sanding, polishing or surface treatment (as by urethane or the like) may be applied after curing, if wished, and successive layering may be achieved, including for the purpose of inexpensibly changing facing appearance, when desired. The fire-retardancy and inhibition resulting from the aluminum trihydrate has been found to be most effective, as has the removal of cigarette or other burns or stains by sanding.

If a slab of simulated stone by itself is desired without substrate, of course, or any artificial stone-like decorative or other item, or article shaped from this flattened stone-pattern-appearing material that has been prepared in accordance with the invention before curing, such may be readily produced from the material of the invention, all with the stone-like markings appearing throughout the cured slab or decorative or other article.

Further modifications will occur to those skilled in this art including the use of other finish or mold surfaces than the mold sheet 7 against which the coating mixture is rolled (table tops, decorative items, bathroom and kitchen surfaces and fixtures, etc.), and the forming of slabs or panels of simulated stone throughout, and also other decorative simulated stone articles, such being considered to fall within the spirit and scope of the invention as defined in the appended claims.

What is claimed is:

1. A method of fabricating an artificial stone-like facing as for attachment to a substrate, that comprises, preparing a mixture of a wet, soft and uncured synthetic resin binder, color pigment and filler particles and curing agent for the resin, for ultimate attachment to a permanent substrate; applying the mixture to a temporary substrate, presenting a wet surface of irregular and uneven particles; successively and continuously pressing together by rolling pressure successive adjacent portions of the irregular and uneven surface of the wet, soft and uncured resin mixture against the temporary substrate into a flat surface and maintaining the mixture in a cooled condition, as by refrigeration, to inhibit curing and keeping the same soft and uncured until removed from such cooling for application to a permanent substrate.

2. A method as claimed in claim 1 and in which, upon removal from said cooling, the mixture is applied to the said permanent substrate, is rolled there against and thereafter permitted to cure by the action of said curing agent.

3. A method as claimed in claim 2 and in which said temporary substrate is separated from the mixture before curing and either before or after application to the said permanent substrate.

4. A method as claimed in claim 1 and in which the uncured synthetic resin binder is selected from the group consisting of polymerizable unsaturated polyester resins, with and without styrene monomers, epoxy resins, and urethane resins; said filler particles are selected from the group consisting of silica, powdered talc, powdered quartz, diatomaceous earth, gypsum, powdered glass, clay minerals, illite, powdered chalk, powdered marble, powdered limestone, aluminum silicate, aluminum stearate, calcium silicate, boracite, borax and alumina trihydrate; said color pigments are selected from the group consisting of inert inorganic powders and pastes, and polyester-dispersed pigments; and said curing agent is selected from the group consisting of polymerization catalysts including free radical catalysts based on peroxide-type compounds, methyl ethyl ketone peroxide, benezoyl peroxide and tertiary butyl hydroperoxide.

5. An artificial stone-like facing preparation for storing in uncured condition under refrigeration that comprises a mixture of a wet, soft and uncured synthetic resin binder, color pigment and filler particles and curing agent for the resin, all pressure-crushed into flat form against a temporary substrate prior to refrigeration.

6. An artificial stone-like facing preparation as claimed in claim 5 comprising a mixture of polyester resin, polyester-dispersed pigment and aluminum trihydrate filler.

7. An artificial stone-like facing preparation as claimed in claim 5 and in which the uncured wet and soft synthetic resin is selected from the group consisting of polymerizable unsaturated polyester resins, with and without styrene monomers, epoxy resins and urethane resins; said color pigments being selected from the group consisting of inert inorganic powders and pastes and polyester-dispersed pigments; and said filler particles being selected from the group consisting of powdered silica, silicates, quartz earths and clays and aluminum trihydrate.

8. A method of fabricating an artificial stone-like article, that comprises, preparing a mixture of agglomorated particles of wet, soft and uncured synthetic resin binder, color pigment and filler particles and curing agent for the resin; applying the mixture to a temporary substrate, presenting a wet surface of irregular and uneven particles; successively and continuously pressing together by rolling pressure successive adjacent portions of the irregular and uneven surface of the wet, soft and uncured agglomorated particulate, resin mixture against the temporary substrate into a flat surface with a resulting stone-simulated pattern throughout the same; and removing the wet, soft and uncured pressure-rolled flat stone-simulated material from the temporary substrate; forming the same into the desired shape for the article and permitting the curing in such shape under the action of the said curing agent.

9. A method as claimed in claim 8 and in which the said flat mixture is cooled to maintain it uncured before said forming.

10. An artificial stone-like article fabricated by the method of claim 8.

11. An artificial stone-like article comprising a mixture of polyester resin, curing agent, polyester-dispersed pigment, preferably fumed silica filler and aluminum trihydrate filler, all pressure-rolled into a flat stone-pattern-simulated surface and then formed into the artificial stone-like article and cured in such form by said curing agent.

* * * * *